Patented Jan. 3, 1950

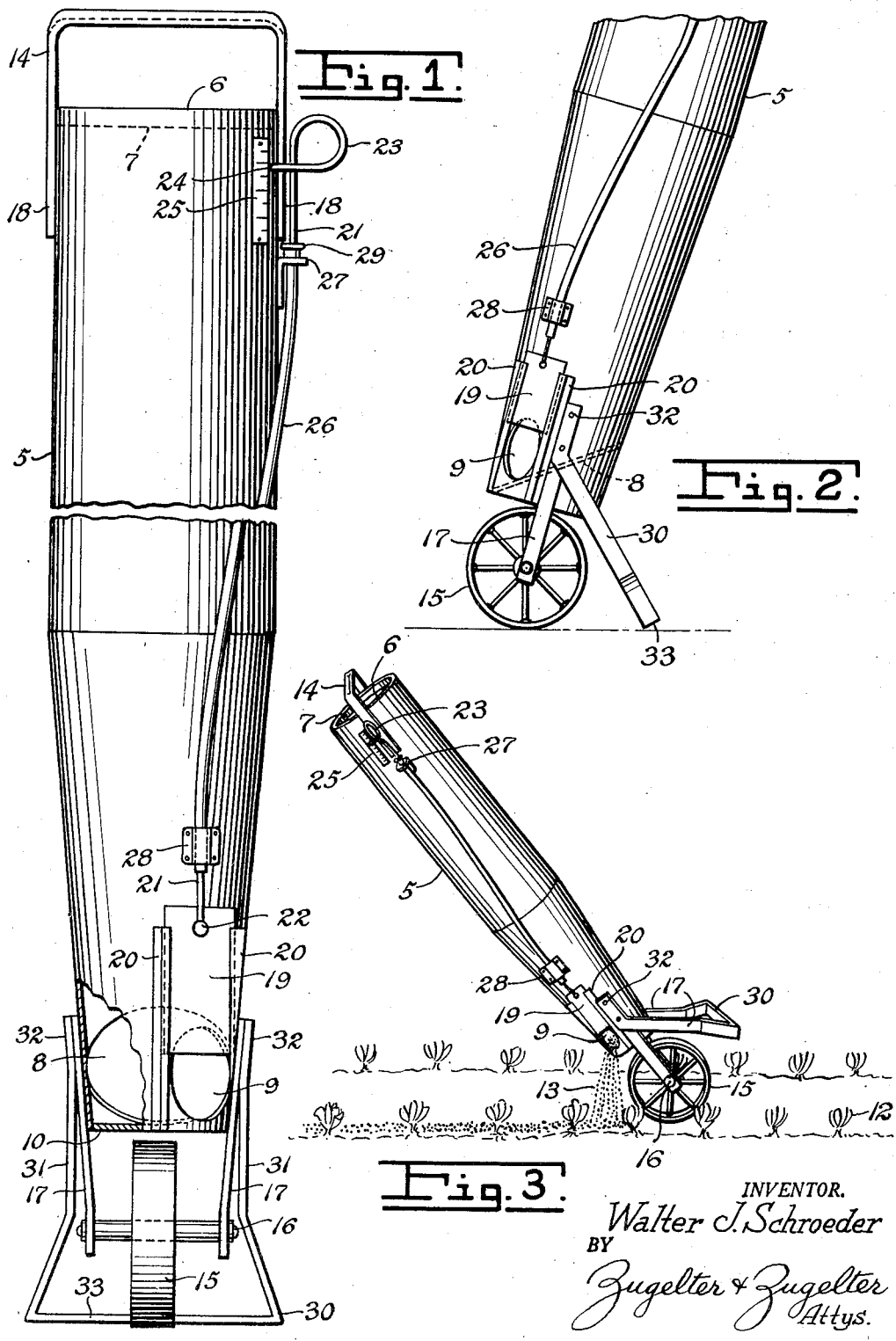
Jan. 3, 1950 — W. J. SCHROEDER — 2,493,599
SINGLE-ROW FERTILIZER APPLICATOR
Filed June 10, 1947
INVENTOR.
Walter J. Schroeder
BY Zugelter & Zugelter
Attys.

2,493,599

UNITED STATES PATENT OFFICE 2,493,599

SINGLE-ROW FERTILIZER APPLICATOR

Walter J. Schroeder, Cincinnati, Ohio

Application June 10, 1947, Serial No. 753,714

5 Claims. (Cl. 222—176)

This invention relates to a device for applying fertilizer in a convenient and proper manner to growing plants and other vegetation. The device is suited particularly for use in the care of home gardens or other tracts of moderate size.

An object of the invention is to provide an applicator for fertilizer substances, which automatically effects side-dressing of the growing vegetation in such manner as to feed the root systems economically and without danger of burning or otherwise injuring the foliage.

Another object is to provide a side-dressing implement of the character referred to, in which the flow of fertilizing substance leaving a hopper or reservoir is steady and reliably constant, and the volume thereof always under the control of the operator.

A further object of the invention is to provide such an implement which is handy and convenient to use, the operation thereof being facilitated by reason of its simplified light-weight construction, and compact disposition of constituent parts.

Another object is to produce the implement above referred to at a low manufacturing cost, using readily available materials which are comparatively inexpensive and easily formed by means of simple machinery and unskilled labor.

The foregoing and other objects are attained by the means described herein and illustrated upon the accompanying drawing, in which:

Fig. 1 is a rear elevational view of the applicator, part being broken away to show interior construction.

Fig. 2 is a fragmental side elevational view showing the device in non-use position, and supported upon its stand.

Fig. 3 is a side perspective view showing the device in use for side-dressing a row of growing plants with fertilizer.

Common practice with gardeners and nurserymen in feeding plants and other vegetation, has been to either broadcast a fertilizing material over the ground, or to locally distribute the material between the rows of plants. In some instances, it was desirable also to place a limited quantity of fertilizer in the vicinity of each plant, and while this practice was relatively economical from the standpoint of cost of fertilizer, it was also very laborious and, for that reason, costly of performance. It is the purpose of the present invention to avoid the waste of time and materials resulting from the old methods of fertilizing the soil about the plants, while at the same time eliminating the bodily fatigue ordinarily attending such work.

Referring to the accompanying drawing, the device of the invention is seen to comprise a substantially cylindrical tubular casing or container 5, reduced in diameter in the direction of its lower end. The container may be constructed of sheet metal or other suitable material, in one or more parts. The open top 6 may be reinforced by a rigid band 7, if desired, and may serve as a charging opening receptive of fertilizing material or the like in the form of powder, granules, or possibly a liquid. Material introduced through the top opening normally rests upon a bottom member 8, which preferably is tilted or inclined to facilitate gravitation of the material toward a discharge port or aperture 9 formed in the side wall of the container near the lower end thereof. The lower end may be capped, as by means of a disc 10 welded or otherwise suitably fastened in place beneath the bottom member 8.

As indicated by Fig. 3 of the drawing, the implement is adapted to be rolled along the surface of the earth, parallel to a row of plants 12, while discharging fertilizer from port 9 as indicated at 13. Accordingly, it is provided with a handle 14 and roller means 15, the latter being preferably in the form of a single wheel or disc mounted for rotation upon an axle 16. The axle may be suported between brackets 17 welded or otherwise fixedly secured to opposite sides of the container, at opposite ends of a diameter. The hand grasp means or handle 14, in order to be properly accessible for operation of the device, is located slightly above the top of the container, at approximate waist height above ground level. The handle may be fixed to the container top by welding or otherwise securing its spaced arms 18 thereto.

The particular shape of the handle is relatively immaterial, and may take various form. So also, the wheel 15 is subject to alteration or choice of design, and when necessary the wheel may be flattened at intervals upon its periphery to jog the container as it is advanced over the ground, thereby to encourage free flow of fertilizing material through the discharge port 9. It will ordinarily be unnecessary to agitate the material in this manner, however, since a steady and constant flow is ensured by the inclined bottom member 8 directing the material toward the discharge port.

The release of fertilizing material through the discharge port preferably is to be governed by a suitable valve or gate, which in turn may be controlled or actuated by the user of the implement. As herein disclosed, the valve comprises a plate 19 of metal or other suitable material, guided for vertical shifting movement over the port 9 to expose the port or any selected portion thereof. The valve plate may slide in spaced parallel guides 20—20, flanged or rabbetted to accommodate the parallel side edges of the plate. Guides 20—20 may be welded, or otherwise mounted upon the wall of the container, flanking the port 9 and extending above it a sufficient distance to retain the valve plate, in the fully open position of the valve. The valve plate may be arched longitudinally, to coincide with the curvature of the container wall.

Control means for the valve may comprise a flexible wire or cable 21 having its lower end attached to the valve plate 19 at an anchorage stud 22, while at the upper end the flexible wire or cable is furnished with a finger grip 23. Although the finger grip may vary in form, it is herein disclosed as a loop developed on the upper end of the wire or cable, with its free end 24 turned inwardly to overlie a scale or graduated plate 25, thereby to serve as a pointer or indicator visually indicating the position of the valve plate over the discharge port 9. By means of this indicator and finger grip arrangement, the operator of the implement may at all times control the flow of material through the discharge port, and regulate it to suit any requirements, as he advances the implement over the ground.

The flexible cable or wire 21 is longitudinally shiftable within a flexible or rigid tube 26 mounted closely adjacent to the container wall by means of brackets 27 and 28 welded, riveted, or otherwise fixed to the wall of the container. A ferrule overlying the bracket 27 and indicated at 29, may be anchored to the bracket for support of the upper end of the tube.

As is evident from the several drawing views, there is a slight twist or spiral disposition of tube 26 about a portion of the container. This is made necessary by the fact that the valve and port 9 are peculiarly located upon the device, to effect discharge of fertilizer material rearwardly and to one side of the wheel 15, for side-dressing the plants or vegetation to be fed. The term "side-dressing" as used herein, means the application of fertilizer alongside the plants of a row, at a safe distance of one or two inches from the stems, the fertilizer being placed at a low elevation such that none of it may fall upon and injure the plant foliage. By so placing the fertilizer carefully and accurately where it will do the most good for the plant, a substantial economy is effected and the maximum yield of the crop is assured. By means of the present invention, accuracy of application is attained, without extra care or effort on the part of the operator, by mere advancement of the applicator alongside the plant row at a proper distance therefrom as the fertilizer material issues from the discharge port at a rate predetermined by the operator. The twist of the tube 26 results from locating the finger grip 23 at the side of the container, whereas the valve and discharge port are located toward the rear of the side, but not directly beneath it in line with wheel 15.

It is desirable that the fertilizer applicator be provided with a stand or supporting member, to maintain the device in an upright position of non-use as indicated by Fig. 2. Such a stand or support is indicated generally by the character 30, and may consist of a substantially U-shaped frame having spaced arms 31 the free ends of which are attached to the container, or to the arms 17, at the locations 32—32. The attachment at these locations may be effected in any suitable manner, as by means of welds or rivets. To add stability to the stand or support, the crossbar 33 thereof may be extended in length, by flaring the arms 31—31 downwardly and outwardly as indicated upon Fig. 1. The arms 31 of the stand project forwardly of wheel 15, and downwardly toward ground level, in the direction of normal advancement of the applicator when in use, as indicated upon Fig. 3. The stand thereby serves as a bumper or diverter for the foliage of vegetation or plants in the advanced stage of growth, thereby preventing the wheel from damaging the plants while at the same time the stand displaces the foliage sufficiently to preclude application of fertilizer thereon. This same function is performed by the wheel brackets 17—17, and in the case of tall vegetation the cylindrical form of container 5 proves highly advantageous as it presents no sharp corners or projections which might catch the plant stems or foliage and inflict injury thereon as the applicator is advanced between the rows of plants. The valve mechanism, for the same reason, is mounted substantially flush with the wall of the cylindrical container.

From the foregoing, it will be appreciated that the device of the invention constitutes a handy and convenient means of side-dressing plants and vegetation growing in rows. The device also may be used for other purposes, such as for applying fertilizer substance in circular continuous hills about trees, shrubbery and the like, with complete control of the amount of material discharged. When side-dressing rows of plants and the like, the device applies the fertilizing material at a low elevation above ground level, and to the inward side of wheel 15, so that the wheel may be advanced along the surface of the earth at safe distances from the plants, while at the same time the discharge of fertilizer is effected within an inch or two of the plant stems, where it will most effectively and economically feed the root systems of the plants. As stated above, the slender cylindrical form of the device precludes entanglement of any of its parts with the plant stems and leaves, and in addition, this construction maintains a substantially high column of fertilizer substance in reserve, so that the weight of the substance is utilized to advantage in maintaining a steady and uniform flow through the discharge valve port until the container is empty. The inclined bottom member 8 directs the fertilizer toward the discharge port at all times, and ensures complete exhaust of material from the container until it is empty.

It is to be understood that various modifications and changes in the structural details of the device may be made, within the scope of the appended claims, without departing from the spirit of the invention. For example, the stand 30 may be changed in form if desired, or may be omitted entirely. The single wheel 15 might be replaced with a pair of wheels, and if desired, the open top 6 of the container might be furnished with a suitable cap or lid. Such a cap or lid, however, will be found unnecessary if the device is provided with a stand as illustrated upon the drawing.

It is contemplated also that the discharge port 9 may be altered in shape without departing from the invention, and the guide means for the valve is subject to slight change in the interest of economy of manufacture and assembly.

What is claimed is:

1. A fertilizer applicator to side-dress growing vegetation, comprising in combination, an elongate slender container having an upper charging opening substantially at waist elevation, and a lower end including a discharge port to release a continuous flow of fertilizer from the container, a rigid steering handle on the container near the upper charging opening, and a single earth-contacting wheel including means on the container for rotationally supporting the wheel substantially in line with the container axis and beyond the discharge port, whereby the container may be inclined and freely tilted at any angle above the point of contact of the wheel with the earth, the wheel and the handle both being substantially in line with the major axis of the container to provide for steerage of the applicator by merely twisting the handle in a plane which is normal to said axis, the discharge port being located to one side of the wheel plane for discharging fertilizer laterally of the direction of travel of the applicator.

2. A fertilizer applicator to side-dress growing vegetation, comprising in combination, a tubular slender container having an upper end substantially at waist elevation, and a lower end having a discharge port to release a continuous flow of fertilizer laterally from the container, a single earth-contacting wheel and means on the lower end of the container including a fixed axle located beyond the discharge port, for rotationally supporting the wheel substantially in line with the container axis, whereby the container is rendered freely inclinable and tiltable at any angle above the point of contact of the wheel with the earth, a rigid steering handle fixed near the upper end of the container, to be grasped for so inclining and tilting the container and freely rotating the container on its own major axis for steering purposes, as the container is advanced over the surface of the earth incident to rotation of the wheel, the discharge port being located to one side of the wheel plane for discharging fertilizer laterally of the direction of travel of the applicator.

3. A fertilizer applicator to side-dress growing vegetation, comprising in combination, a tubular slender container having an upper end substantially at waist elevation, and a lower end having a discharge port to release a continuous flow of fertilizer laterally from the container, a single earth-contacting wheel, and means on the lower end of the container including a fixed axle located beyond the discharge port, for rotationally supporting the wheel substantially in line with the container axis, whereby the container is rendered freely inclinable and tiltable at any angle above the point of contact of the wheel with the earth, a rigid steering handle fixed near the upper end of the container, to be grasped for so inclining and tilting the container and freely rotating the container on its own major axis for steering purposes, as the container is advanced over the surface of the earth incident to rotation of the wheel, the discharge port being located to one side of the wheel plane for discharging fertilizer laterally of the direction of travel of the applicator, and means overlying the wheel rim, and extending laterally beyond the plane of the wheel, to provide a combination stand and deflector of plant foliage at different inclinations of the container.

4. A fertilizer applicator to side-dress growing vegetation, comprising in combination, a tubular slender container having an upper end, and a lower end having a discharge port to release a continuous flow of fertilizer laterally from the container, an earth-contacting wheel, and means on the lower end of the container including a fixed axle located beyond the discharge port, for rotationally supporting the wheel directly beneath the container, with the container axis lying in the plane of the wheel, whereby the container is rendered freely inclinable and tiltable at any angle above the point of contact of the wheel with the earth, a rigid transverse steering handle on the container located at waist height above the upper end of the container, and arranged to be grasped for so inclining and tilting the container and rotating the container on its own major axis for steering purposes as the container is advanced over the surface of the earth incident to rotation of the wheel, the steering handle being located substantially upon the container axis and traversing the upper end of the container, the discharge port being located to one side of the container and the wheel plane, for discharging fertilizer laterally of the direction of travel of the applicator.

5. A fertilizer applicator to side-dress growing vegetation, comprising in combination, a tubular slender container having an upper charging opening substantially at waist elevation, and a lower discharge port to release a continuous flow of fertilizer laterally from the container, a rigid steering handle on the container above the charging opening and extending laterally across the charging opening, and a single earth-contacting wheel including an axle and a bracket on the container, located beyond the discharge port, for rotationally supporting the wheel directly beneath the container, whereby the container is rendered freely inclinable and tiltable at any angle above the point of contact of the wheel with the earth, the plane of the wheel and the handle both being substantially in line with the major axis of the container to provide for steerage of the applicator by merely twisting the handle in a plane which is normal to said axis, the discharge port being located to one side of the wheel plane for discharging fertilizer laterally of the direction of travel of the applicator, and the container being reduced in size in the region of its wheeled end, to avoid interference with the foliage of plants undergoing treatment.

WALTER J. SCHROEDER.

REFERENCES CITED

The following references are of record in the file of this patent:

UNITED STATES PATENTS

| Number | Name | Date |
| --- | --- | --- |
| 1,562,002 | Rieff | Nov. 17, 1925 |